United States Patent [19]

Draper et al.

[11] Patent Number: 4,601,115
[45] Date of Patent: Jul. 22, 1986

[54] METHOD AND APPARATUS FOR STEAM DRYING OF LOW-RANK COALS USING A ROTARY CYLINDRICAL VESSEL

[75] Inventors: Robert Draper, Churchill Boro; Robert W. Wolfe, Wilkinsburg, both of Pa.

[73] Assignee: Westinghouse Electric Corp., Pittsburgh, Pa.

[21] Appl. No.: 727,948

[22] Filed: Apr. 26, 1985

[51] Int. Cl.⁴ ............................................. F26B 3/04
[52] U.S. Cl. ........................................ 34/32; 34/77; 34/131; 34/137
[58] Field of Search ............... 34/169, 57 A, 172, 177, 34/10, 26, 35, 86, 68, 27, 32, 77, 78, 79, 131, 135, 136, 137

[56] References Cited

U.S. PATENT DOCUMENTS

| | | | |
|---|---|---|---|
| 1,907,569 | 5/1933 | Parr et al. | 34/27 |
| 2,666,269 | 1/1954 | Parry | |
| 3,744,221 | 7/1973 | Ross | 34/131 |
| 4,052,168 | 10/1977 | Koppelmann | |
| 4,284,476 | 8/1981 | Wagener et al. | 34/86 |
| 4,339,306 | 7/1982 | Janusch | |
| 4,379,692 | 4/1983 | Weber et al. | |
| 4,400,176 | 8/1983 | Kuhta | |
| 4,523,388 | 6/1985 | Cuel | 34/35 |

OTHER PUBLICATIONS

"A Study on Upgrading of Low Grade Coals by Heat Treatment" K. Toada et al.; Technical Review, Oct. 1982, pp. 259–266.
Steam Drying of Lignite; Stanmore et al., NTIS, U.S. Dept. of Commerce, Springfield, VA 22161 (1982).
"Enriching Western Coals by Thermal Drying and Oil Treatment", Wegert et al., Coal Age, May, 1976, pp. 96–100.
Technical and Economic Study of Drying Lignite & Subbituminous Coal by the Fleissner Process; Harrington et al., U.S. Govt. Printing Off., 1942.

Primary Examiner—Larry I. Schwartz
Attorney, Agent, or Firm—Daniel C. Abeles

[57] ABSTRACT

Low-rank coals, such as lignite, are dried by evaporating interstitial water therefrom in a superheated steam flow countercurrently passed through a sealed rotary cylindrical vessel. A composite steam discharged from the vessel is partially condensed to remove an amount of water therefrom substantially equal to the amount of water removed from the coal, with a resultant flow of residual steam reheated and returned to the cylindrical vessel for further drying of low-rank coal.

15 Claims, 1 Drawing Figure

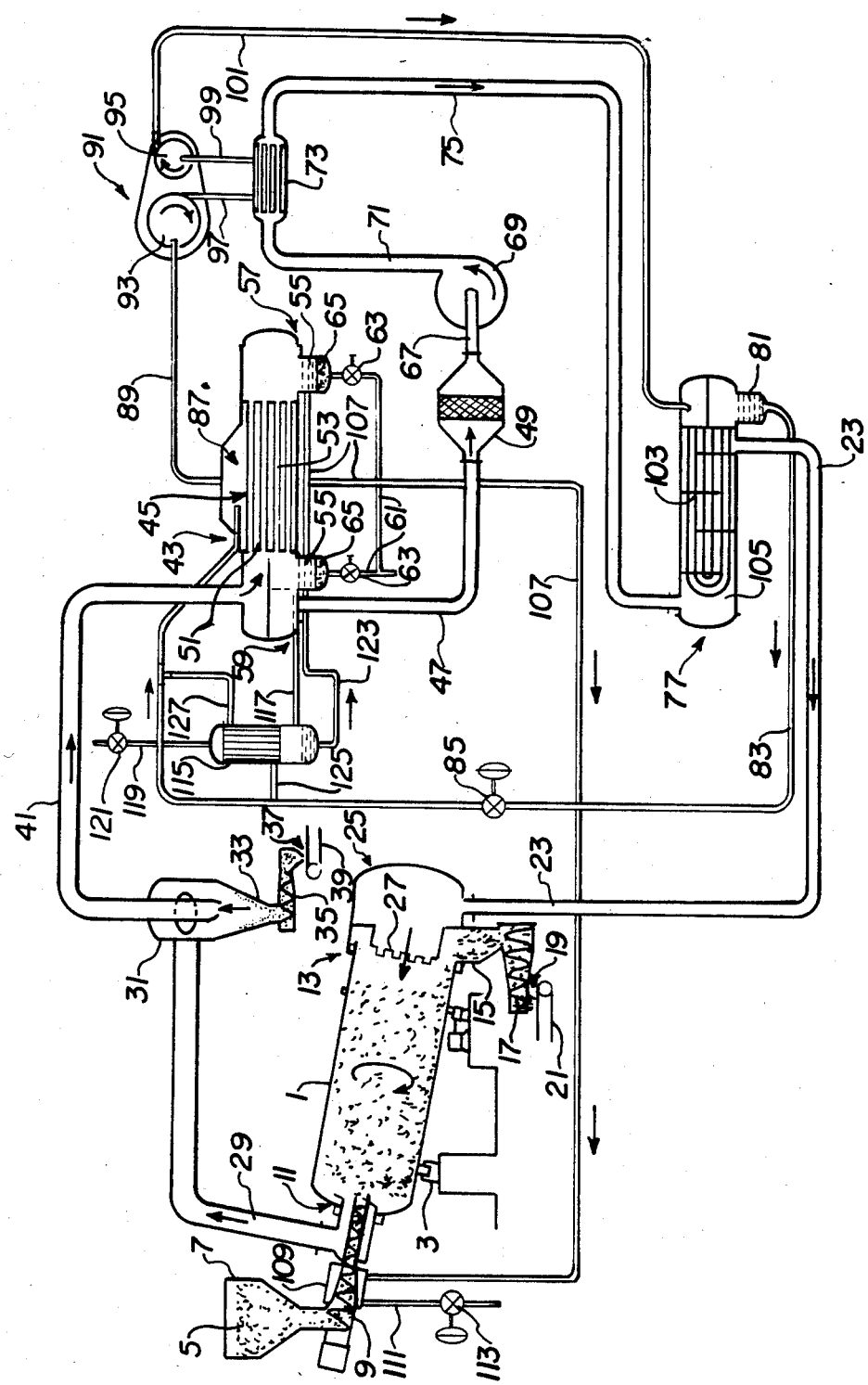

METHOD AND APPARATUS FOR STEAM DRYING OF LOW-RANK COALS USING A ROTARY CYLINDRICAL VESSEL

CROSS-REFERENCE TO RELATED APPLICATIONS

An apparatus and method for drying of low-rank coals, using a fluidized bed steam drying system and partial condensation of composed steam from a drying vessel in a sealed condenser, are described in a related application of the present inventors, Ser. No. 727,950, entitled "Method and Apparatus for Fluidized Steam Drying of Low-Rank Coals", filed on even date herewith assigned to the assignee of the present invention.

An apparatus and method for drying of low-rank coals using a fluidized bed steam drying system and wet scrubbing of composite steam from the dryer, are described in a related application of the present inventors, Ser. No. 727,949, entitled "Method and Apparatus for Fluidized Steam Drying of Low-Rank Coals with Wet Scrubbing", filed on even data herewith also assigned to the assignee of the present invention.

BACKGROUND OF THE INVENTION

Reserves of lignite and subbituminous coals in the United States are estimated to be in excess of 1 trillion tons. Demonstrated reserves are presently placed at 250 billion tons. This vast energy reserve is for the most part located in sparcely populated areas of the western United States and in the western gulf states. A large fraction of the reserves are near to the surface and can be strip mined at low cost.

In 1960, the production of lignite and subbituminous coals was insignificant on the national scale. Presently, these low-rank coals account for approximately 25% of the 900 million tons per year United States production rate. Lignite and subbituminous coal production has accounted for virtually all of the growth in coal production which has taken place in the United States in the last decade.

Low-rank coals have relatively low sulphur content. Low sulphur content generally results in easier compliance with regulations pertaining to emissions of combustion products to the atmosphere. As mined, the sulphur content of lignite ranges from 0.3% by weight to 1% and is most commonly about 0.7%. This compares favorably with bituminous coals which range in sulphur content from 1.2% by weight to 3.5%.

The one significant impediment to the use of lignite and subbituminous coal is their high water content. For lignite mined in the United States the water content ranges from 25% by weight to 45% by weight. High water content supresses the caloric value of the coal, creates handling problems, and increases transportation cost. For these reasons, there is great interest in developing economical methods of drying low-rank coals.

Lignite and subbituminous coals hold water in three ways. First, these low-rank coals hold surface water. The amount of surface water which might be present following a wet cleaning process increases with decreasing particle size. Coals crushed to about ¼ in. particle size hold between 10 and 15% by weight surface water. When the coal is crushed to 28 mesh size, surface water can account for as much as 45% of the bed weight. Removal of surface water is accomplished quite readily and the process is commonly called dewatering.

Low-rank coals (especially lignite) hold water in interstitial cavities between the carbonaceous fibers. Interstitially held water can account for as much as 45% of the weight of a bed of lignite from which surface water has already been removed. While lignite and subbituminous coals hold comparable amounts of postwash surface water to coals of similar particle size but high caloric rank, the presence of a large amount of interstitial water is unique to the lower-rank coals. The process used to remove interstitially held water is termed drying. Because interstitial water is held in the small pores between the coal fibers, it is not readily removed by mechanical means. Present thermal drying methods are overly consumptive of energy; consequently, low-rank coals are usually transported and burned without the beneficial effect of drying.

Another way in which water is held in low-ranked coals is in very small closed pores within the carbonaceous fibers. Because the pores are unconnected, removal of this water is extremely difficult and thermal methods provide the only means. For this reason, this water is referred to as bound water. Bound water constitutes only a few percent of the mass of coals of all calorific ranks and as such, does not represent an attractive target for removal, moreover, no economical means exist for its removal.

As mentioned above, the removal of surface water is termed dewatering. For the most part, dewatering is accomplished by mechanical means. Such means include shaker screens which continually disrupt the coal/water matrix and cause the water to drain from the bed under gravity. Centrifuges are also used to dewater low-rank coals. Another means of removing surface water is vacuum filtration. In vacuum filtration, air is sucked through the bed of coal and draws the water with it. Vacuum filtration can be used in conjunction with vibratory and centrifugal methods. Dewatering can be assisted by the addition of surfactants which lower the surface tension of the water and the application of heat, which, by virtue of an increase in temperature, reduces both surface tension and viscosity. The application of an ultrasonic sound field has been shown to assist the dewatering of fine coal particles.

Thermal dewatering methods involve blowing hot air or the products of combustion through the coal bed. Some heat recovery is possible. However, psychrometric restraints make the recovery of the latent heat of vaporization impractical when the steam is mixed with a large quantity of noncondensible gases. For this reason, present thermal dewatering methodologies are relatively uneconomical and are not widely practiced.

Water held interstitially within the particles of low-rank coals makes no contribution to the calorific value of the coal. Rather, from a caloric viewpoint, it is parasitic in that it absorbs heat to achieve evaporation. Moist coal can freeze in stockpiles during cold weather and transporation costs are inflated because unwanted water is shipped with the coal. For these reasons, and because low-rank coals represent one of the nations most important fossil energy resources, there is growing interest in developing means of removing interstitially held water. This process, as mentioned above, is termed drying, as opposed to dewatering which is correctly applied to the removal of surface water. Presently, very little lignite and subbituminous coal is dried in the United States.

Not surprisingly, the techniques which have been applied to the removal of small amounts of water (a few percent by weight) from high-rank coals have been examined for their applicability to drying lignite and subbituminous coals. These methods are based upon the concept of bringing the coal particles into contact with a hot gas stream such as air or the products of combustion. Tumbling the coal particles in a rotating drum through which the hot gas stream is passed and fluidizing a bed of coal particles with the hot gas stream are two methods which have been used to dry high-rank coals. Two factors combine to render these methods unsatisfactory for the drying of low-rank coals. First, the weight of water which must be evaporated per pound of dried product is much greater for low-rank coals than for high-rank coals. Relative to high-rank coals, the overall economics of low-rank coal utilization is much more sensitive to the economics of the drying process. Moreover, the traditional form of drier, described above, does not operate efficiently from a thermal viewpoint. This is because the low partial pressure of the steam in the steam/hot gas exhaust makes it difficult to recuperate the latent heat of vaporization. Consequently, the energy consumed in drying a low-rank coal exceeds 10% of the caloric value of the dried product.

A second reason why existing thermal driers are not suitable for drying lignite and subbituminous coal is that these coals are more susceptible to spontaneous ignition as they approach a fully dried condition than are higher-rank coals. Reactivity in air increases with decreasing rank because low-rank coals contain a higher fraction of volatile matter. Fine particles of dry lignite present a serious explosion hazard in a high temperature environment containing free oxygen.

Another new drier type which is under investigation is the so-called hot water drier. In this drier, lignite is mixed with water to form a slurry which is then heated to about 650° F. at a pressure sufficient to maintain liquid conditions ($P \cong 2200$ psi). At high temperature, carboxylic groups within the lignite decompose to form carbon dioxide. The $CO_2$ gas expels much of the water from the interstitial cavities. Hydrophilic carboxyl groups on the surface of the coal granule are replaced by hydrophobic hydrocarbon groups. This effect along with capillary factors inhibits repenetration of the interstitial cavities by the water as the system is cooled down and depressurized. Test data indicates that this system is capable of reducing the water content of lignite to about 10% by weight. The high operating values of temperature and pressure present significant difficulties in the design of commercial sized equipment.

Although mechanical methods dominate dewatering technology, they yield to thermal methods when it is necessary to do drying which, by our definition, implies removing interstitially held water. Some work on mechanical drying methods has been performed, however. In this regard, it is estimated that a centrifuge operating with a centrifugal acceleration of $5 \times 10^4$ ft/sec$^2$ (twice the highest value used in dewatering equipment) will reduce the water content of a 1 ft. deep bed of lignite from 45% to 10% in 1 minute. Unfortunately, this is associated with a hoop stress close to 17,000 psi. This stress is close to the allowable operating level for alloy steels.

There is interest in the application of ultrasonic compression waves to assist other mechanical drying means such as centrifuging, vacuum filtration, and pressure displacement. However, this technology is in an embryonic stage and any forecast as to its ultimate role in drying low-rank coal is purely speculative.

It is an object of the present invention to dry low-rank coals in a cylindrical rotating vessel using a superheated steam flow.

SUMMARY OF THE INVENTION

An apparatus and method for drying low-rank coal containing interstitial water using superheated steam in a rotary cylindrical sealed vessel. A rotary cylindrical sealed vessel has an inlet for charging the coal to one end thereof and an inlet for charging superheated steam to the other end. The coal is heated and water evaporated therefrom which forms a composite steam with the countercurrently flowing superheated steam. The coal, with water removed, is discharged from the vessel and the composite steam also discharged. A partial condenser is provided to partially condense the composite steam flow to remove a supply of condensed water, substantially equal to the water removed from the low-rank coal in the rotary cylindrical sealed vessel, and the flow of steam is then reheated and returned for injection into the rotary cylindrical sealed vessel for reuse. Means are provided for heating the recirculating steam comprising a closed circuit of fluid, such as methanol or a secondary steam circuit.

DESCRIPTION OF THE DRAWING

The drawing is a schematic illustration of an apparatus of the present invention for use in the method of the present invention for drying of low-rank coal.

DETAILED DESCRIPTION

The present invention provides an apparatus and continuous method for drying low-rank coals. "Low-rank coals" as used herein, is used to describe solid carbonaceous fuels having a water content in excess of about 25 percent by weight of the solid carbonaceous fuel. Such low-rank coals include lignite, peat, and subbituminous coals which contain water as surface water, interstitial water, and bound water. For the purpose of brevity, the following description will refer to the use of lignite, although drying of other low-rank coals is includable in the invention. The drying of the low-rank coals is effected to give a residual water content of less than about 5 percent by weight based on the weight of the low-rank coal.

In the drawing, an apparatus for use in carrying out the present method is illustrated. A sealed, rotary cylindrical vessel 1, rotatable on rollers 3 or by other means, has lignite 5 charged from a hopper 7, by means of a charging screw 9, to one end 11 of the vessel. The lignite passes through the rotary cylindrical vessel 1, and is dried therein, and is discharged at the other end 13 of the vessel through an offtake 15, through a screw conveyor 17, and is discharged from the system at 19 for removal by conveyor 21 or other means.

Superheated steam from line 23 is charged to the other end 13 of the rotary cylindrical vessel, having a header section 25, through steam injectors 27. As the superheated steam flows through the rotary cylindrical vessel 1, countercurrent to the flow of the lignite, water is removed from the lignite which forms a composite steam flow. The term "composite steam" as used herein, designates the steam exhausted from the sealed vessel, which is comprised of the steam injected into the sealed vessel for heating of the lignite, as well as the steam resulting from evaporation of water from the lignite.

The composite steam flow is discharged from the rotary cylindrical vessel 1, at the one end 11, through an exhaust line 29. From exhaust line 29, the composite steam enters a solids separator, such as a cyclone 31, in which solids are removed. Solids in the solids separator 31 are collected in a discharge hopper 33 from which they are removed by a screw conveyor 35 and discharged at 37 to a removal means such as a conveyor 39. The composite steam is exhausted from the solids separator 31 through line 41 and fed to a closed vessel partial condenser 43, for partial condensation and recirculation, after heating, to the rotary cylindrical vessel 1. In partial condenser 43, a mass of steam substantially equal to the water removed from the low-rank coal is condensed by contact with cooling tubes 45. The uncondensed steam passes through the heat exchanger 43 and through line 47 to a filter 49. The reason for directing the full flow of composite steam into the partial condenser 43, as opposed to using a full condenser in a side stream configuration, is that the condensing heat transfer coefficient is improved by increasing mass velocity in three ways. First, a higher mass velocity promotes a thinner, higher velocity, condensate film. Second, the presence of noncondensible gases, such as air, is less deleterious to heat and mass transfer when the mass velocity is high. Third, the tendency for a fouling film to form on the tube wall of the partial condenser 43 is lessened with increasing mass velocity. It is worth noting at this point, that the reason for preferring tubeside condensing is that in a shell and tube heat exchanger, the tube bores are more easily cleaned than their outer surface.

A two pass tubeside condenser 43, having cooling tubes 45, is illustrated as the preferred partial condenser since it allows the condensate, and any foulant which might be present, to be separated out of the flowstream after a first pass 51. This improves the heat transfer performance in the second pass 53. The condensate (water) is collected in hotwells 55 provided in the lower section of the return head 57 and inlet/outlet head 59, of the partial condenser 43. Some condensed water and collected silt are discharged from the partial condenser 43 through lines 61 containing discharge valves 63. It is expected that some lignite fines will enter the partial condenser 43 dispite efforts to trap the same in the cyclone separator 31. The partial condenser 43 will act as a separator for these particles, which will form a silt 65 at the botton of the hotwells 55. This silt is removed through lines 61.

After leaving the partial condenser 43 through line 47, the uncondensed steam passes through a filter 49 and line 67 to a blower 69. The need for the filter 49 depends upon the efficiency of the cyclone separator 31 and the separating effectiveness of the partial condenser 43. A low level of lignite fines is required in order to prevent deposition on the blades of blower. The momentum rise which the blower 69 imparts to the recirculated steam is that required to overcome circuit resistances and to accelerate the steam which is evaporated in the sealed rotary cylindrical vessel 1.

From the blower 69, the recirculated steam flows through line 71 to a first heat exchanger unit 73, where it is heated. The recirculated steam then flows through line 75 to a second heat exchange unit 77 where it is further heated. The superheated steam is then discharged from the second heat exchanger unit 77 and into line 23 for charging to the rotary cylindrical vessel 1.

In order to superheat the steam that is charged to the rotary cylindrical vessel 1, a secondary circuit, in the nature of a heat pump, is provided. Where hot methanol is used in the secondary circuit, a supply of methanol 81 is provided in the second heat exchanger unit 77, which has been cooled by exchange of heat with the recycle steam flow. The methanol passes through line 83, which contains an expansion valve 85, the methanol depressurized as it expands, to provide a two phase (vapor and liquid) flow entering the shell side 87 of the partial condenser 43, above the liquid level. Heat exchange is effected in the partial condenser, with composite steam cooled and partially condensed, while methanol is evaporated. Methanol vapors are formed which combine with the methanol vapor fraction of the flow from line 83 and the combined vapor is discharged through line 89, while liquid methanol falls into the naturally circulating pool which floods the cooling tubes 45 in the partial condenser 43. Methanol vapor from line 89 is passed to a multi-stage compressor 91, preferably a two-stage centrifugal compressor, having compression stages 93 and 95. Screw compressors represent a viable alternative under some circumstances and, for very large rotary cylindrical vessels, axial compressors might be used. After the first stage of compression, at 93, the methanol is directed through line 97 to the first heat exchange unit 73 for heat transfer to the recirculating steam. From the first heat exchange unit 73, the methanol is charged through line 99 to the second stage 95 of the two stage compressor 91. After further compression in the second stage 95, the methanol is passed through line 101 to the second heat exchange unit 77 where the same is used to superheat the recirculating steam flow. The heated methanol from line 101 passes through the tube side 103 of the second heat exchange unit 77. The methanol is condensed by heat exchange to the recirculation steam on the shell side 105 of the second heat exchange unit, and the methanol then returns to the supply of methanol 81.

Water collecting in the hotwells 55 of the partial condenser 43 may be discharged therefrom through line 107 to be used in a heating jacket 109 about the charging means 9 to the rotary cylindrical vessel 1, to preheat lignite therein, with the water finally discharged from the system through line 111 containing a discharge valve 113. The steam outlet head 59 of the partial condenser 43 inlet/outlet head contains the highest concentration of noncondensible gases in the entire steam recirculation circuit. In order to isolate and remove such noncondensibles from the system, a small, vertically oriented condenser 115 connects to the steam return head 59 through line 117. The noncondensibles are then exhausted from the system through line 119, containing valve 121, while water is returned to the partial condenser 43 through line 123. The coolant for condenser 115 is methanol extracted from line 83 after the expansion valve 85. The methanol liquid-vapor mixture passes into the condenser 115 through line 125 and leaves through line 127.

Since air is to be excluded from the sealed, rotary cylindrical vessel to the maximum extent possible, the sealed vessel is operated at a positive pressure in the region of 1–3 atmospheres, preferably between about 1–2 atmospheres. Such a pressure of 1–2 atmospheres corresponds to a water saturation temperature of about 121°–135° C.

The low-rank coal in the rotary cylindrical vessel encounters a tumbling action which aids in water removal by a passage of superheated steam therethrough. The temperature of the superheated steam charged to the vessel should be between about 160°-200° C. Where methanol is used as the secondary fluid, the steam temperature would be in the lower region of this range, or about 160°-170° C., due to the possible decomposition of methanol (at a temperature of about 205° C.) in the secondary circuit where higher temperatures would be present. The temperature would preferably be in the higher region of this range, or about 180°-200° C., where steam is used as the secondary fluid, and where decomposition of the secondary fluid would not be a factor.

The evaporating temperature in the partial condenser must be sufficiently below the sealed vessel composite steam temperature to provide a reasonable temperature difference for heat transfer in the partial condenser. A temperature differential of approximately 8° C. is preferred. Bearing in mind that the composite steam temperature is 121°-135° C., this connotes an evaporating fluid temperature of about 113°-127° C.

In the second heat exchange unit 103, a temperature differential of about 10° C. should be maintained, such that in a methanol circuit, the methanol entering the heat exchange unit 103 would be at about 180°-190° C., while methanol leaving the heat exchange unit would be at a temperature of about 170°-180° C. Where steam is used in the secondary circuit, higher temperatures would be usable, or about 180°-200° C. at the inlet to the heat exchange unit and 170°-190° C. at the outlet.

The present invention provides a means for drying low-rank coals to remove interstitial water therefrom using superheated steam in a rotary vessel, while recovering latent heat of vaporization. There are no combustion product emissions using the present system, and relatively clean water is produced as a by-product of the method, which is usable in areas where lignite is mined and water scarce. The present method also eliminates the danger of spontaneous ignition within the rotary vessel since an all steam drying environment is present.

What is claimed is:

1. An apparatus for drying low-rank coal to remove interstitial water therefrom comprising:
    a rotary cylindrical vessel containing means for charging low-rank coal to one end thereof, passing the coal therethrough, and means for removing said low-rank coal therefrom at the other end thereof;
    steam injector means at said other end for charging steam into the rotary cylindrical vessel for passage therethrough, countercurrent to the flow of low-rank coal, to remove water therefrom to form a composite steam flow;
    means for exhausting the composite steam flow from said one end of the rotary cylindrical vessel;
    means for partially condensing said composite steam flow, to which said composite steam flow is passed after exhaustion from the rotary cylindrical vessel, so as to remove a supply of condensed water therefrom substantially equal to the water removed from the low-rank coal in said rotary cylindrical vessel; and
    means for heating said steam flow after removal of said condensed water and returning the heated steam to the rotary cylindrical vessel through said steam injector means.

2. The apparatus as defined in claim 1 including means for separating solids from said composite steam flow after exhaustion from the sealed vessel and prior to said means for partially condensing the same.

3. The apparatus as defined in claim 2 including means for filtering the steam flow after removal of said condensed water and prior said means for heating the same.

4. The apparatus as defined in claim 1 wherein said means for partially condensing said composite steam flow is a tube and shell condenser with the composite steam partially condensed on the tube side of said condenser.

5. The apparatus as defined in claim 4 wherein said condenser contains means for collecting condensed steam and means for discharging the collected condensed steam therefrom and means for allowing said condensed steam to stand to separate solids therefrom prior to said discharge.

6. The apparatus as defined in claim 4 wherein cooled fluid is passed to the shell side of said tube and shell condenser to partially condense said composite steam and evaporate the cooled fluid.

7. The apparatus as defined in claim 6 including a multi-stage compressor wherein said evaporated fluid, after passage through the means for partially condensing said composite steam, is compressed to heat the same.

8. The apparatus as defined in claim 7 wherein said means for heating said steam flow after removal of said condensed water is a heat exchange unit wherein said steam flow is heated by heat exchange with the heated fluid from said multi-stage compressor.

9. The apparatus as defined in claim 1 wherein means are provided to direct condensed water, from the means for partially condensing said composite steam flow, to a heating jacket about the charging means of the rotary cylindrical vessel.

10. A method of drying low-rank coal in a rotary cylindrical vessel comprising:
    charging low-rank coal to one end of a rotary cylindrical vessel for passage therethrough to the other end thereof;
    injecting superheated steam at said other end for flow through the rotary cylindrical vessel countercurrent to the flow of the low-rank coal to heat the coal and remove water therefrom, and form a composite steam flow;
    discharging low-rank coal, having water removed therefrom, from said other end of the rotary cylindrical vessel;
    discharging the composite steam flow from the rotary cylindrical vessel;
    partially condensing said composite steam flow after discharge from the rotary cylindrical vessel;
    removing condensed steam, as water, from the resultant steam flow, in an amount substantially equal to the water removed from said low-rank coal in the rotary cylindrical vessel; and
    heating said resultant steam flow and returning the same as superheated steam for injection into said other end of the rotary cylindrical vessel.

11. The method as defined in claim 10 wherein said resultant steam flow is heated by indirect heat exchange with a fluid.

12. The method as defined in claim 11 wherein said fluid is methanol. pg,17

13. The method as defined in claim 11 wherein said fluid is steam.

14. The method as defined in claim 10 wherein said condensed steam is used to preheat the low-rank coal charged to the rotary cylindrical vessel.

15. The method as defined in claim 10 wherein said low-rank coal is lignite and said lignite is dried to give a residual water content therein of less than about 5 percent by weight.

* * * * *